United States Patent [19]

Teumer

[11] Patent Number: 4,605,041
[45] Date of Patent: Aug. 12, 1986

[54] CHECK VALVE

[76] Inventor: Henry E. Teumer, 5308 Woodline Dr. South, Mobile, Ala. 36609

[21] Appl. No.: 720,137

[22] Filed: Apr. 5, 1985

[51] Int. Cl.⁴ .............................................. F16K 15/03
[52] U.S. Cl. .................................. 137/527; 137/515.7
[58] Field of Search ................. 137/527, 527.2, 527.4, 137/527.6, 527.8, 515.7

[56] References Cited

U.S. PATENT DOCUMENTS

| | | |
|---|---|---|
| Re. 21,334 | 1/1940 | White et al. .......................... 137/69 |
| 542,417 | 7/1895 | Lenhart . |
| 705255 | 7/1902 | Leidecker . |
| 846,317 | 3/1907 | Kiddle . |
| 891,012 | 6/1908 | Shepard . |
| 922,262 | 5/1909 | Clemens . |
| 1,325,568 | 12/1919 | Leidecker . |
| 1,505,958 | 8/1924 | Huntting . |
| 1,673,831 | 6/1928 | Kuehne . |
| 1,742,043 | 12/1929 | McGee . |
| 2,089,141 | 8/1937 | Wasserman . |
| 2,265,596 | 12/1941 | Carlson . |
| 2,268,806 | 1/1942 | Curtis . |
| 2,342,485 | 2/1944 | Percifield .......................... 137/69 |
| 2,482,198 | 9/1949 | Melichar . |
| 2,532,067 | 11/1950 | La Bour . |
| 2,657,824 | 11/1953 | Mariani . |
| 2,664,264 | 12/1953 | Fennema . |
| 2,767,735 | 10/1956 | Darling .............................. 137/527 |
| 2,918,934 | 12/1959 | Wheatley ......................... 137/527.2 |
| 2,930,400 | 3/1960 | Wheatley ......................... 137/527.8 |
| 3,008,650 | 11/1961 | Prokop . |
| 3,016,914 | 1/1962 | Keithahn ............................ 137/515 |
| 3,023,771 | 3/1962 | Hinds ................................ 137/454.2 |
| 3,038,494 | 6/1962 | Gulick ............................... 137/527.2 |
| 3,066,693 | 12/1962 | Taylor ............................... 137/454.2 |
| 3,128,785 | 4/1964 | Krummel ............................ 137/315 |
| 3,131,719 | 5/1964 | Englert et al. ...................... 137/527 |
| 3,144,876 | 8/1964 | Frye ................................. 137/454.5 |
| 3,363,645 | 1/1968 | Miller ................................ 137/527 |
| 3,370,305 | 2/1968 | Goott et al. ............................ 3/1 |
| 3,482,603 | 12/1969 | Outcalt ............................. 137/515.5 |
| 3,509,908 | 5/1970 | Latham et al. ..................... 137/527 |
| 3,604,453 | 9/1971 | Boitnott ............................. 137/527 |
| 3,613,720 | 10/1971 | Welch .............................. 137/527.8 |
| 3,705,602 | 12/1972 | Nordin et al. ....................... 137/512 |
| 3,720,228 | 3/1973 | Wheatley, Jr. .................... 137/454.2 |
| 3,726,341 | 4/1973 | Holbert, Jr. ........................ 166/224 |
| 3,762,438 | 10/1973 | Litchfield ......................... 137/515.5 |
| 3,817,277 | 6/1974 | Wheatley ......................... 137/515.7 |
| 3,933,173 | 1/1976 | Kajita .............................. 137/527.8 |
| 3,937,441 | 2/1976 | Baumann ............................ 251/298 |
| 3,974,848 | 8/1976 | Wheatley ............................ 137/102 |
| 3,990,471 | 11/1976 | Schützer et al. .................... 137/527 |
| 4,039,004 | 8/1977 | Luthy ............................... 137/527 |
| 4,054,153 | 10/1977 | Guyton ............................. 137/527 |
| 4,075,832 | 2/1978 | Diesinger et al. .................... 60/245 |
| 4,114,202 | 9/1978 | Roy et al. ............................ 3/1.5 |
| 4,128,111 | 12/1978 | Hansen et al. ................... 137/515.7 |
| 4,196,745 | 4/1980 | Schützer ......................... 137/512.1 |
| 4,508,139 | 4/1985 | Teumer .............................. 137/527 |

FOREIGN PATENT DOCUMENTS 2216496 8/1974 France .
1214619 12/1970 United Kingdom .

Primary Examiner—Robert G. Nilson
Attorney, Agent, or Firm—Stiefel, Gross, Kurland & Pavane

[57] ABSTRACT

A check valve comprising a valve body with a bore and a counterbore, an insert inside the counterbore, and a flapper with a flapper pin is disclosed. The flapper pin is mounted in a recess in the inside face of the insert. A spring for biasing the flapper toward the closed position is located in a recess in the counterbore face of the valve body.

10 Claims, 7 Drawing Figures

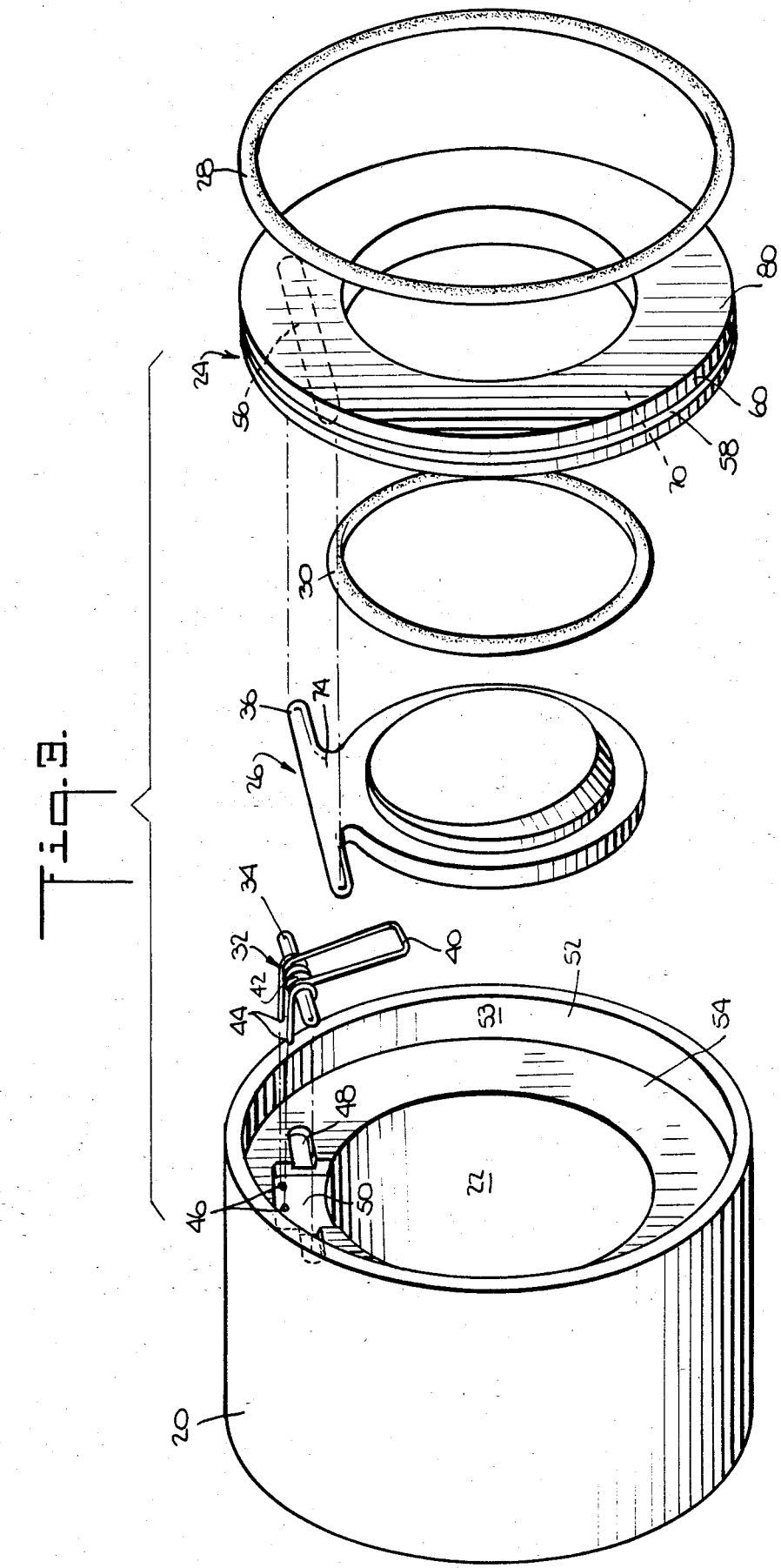

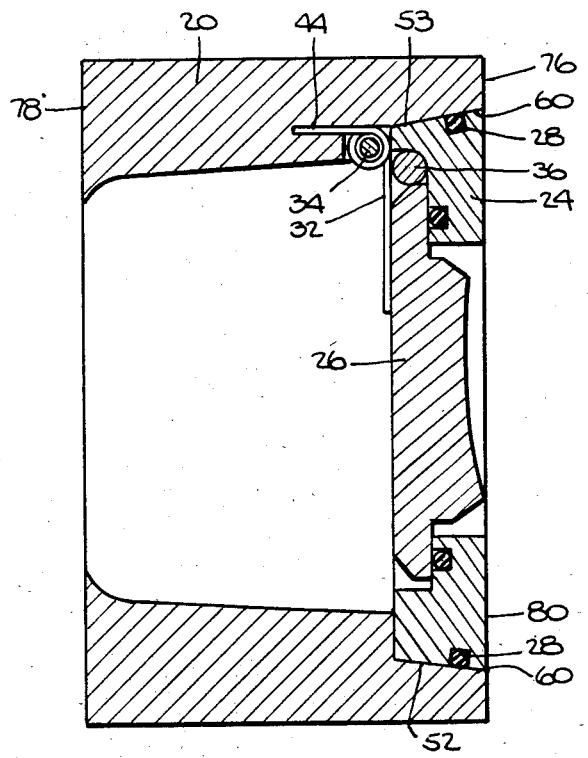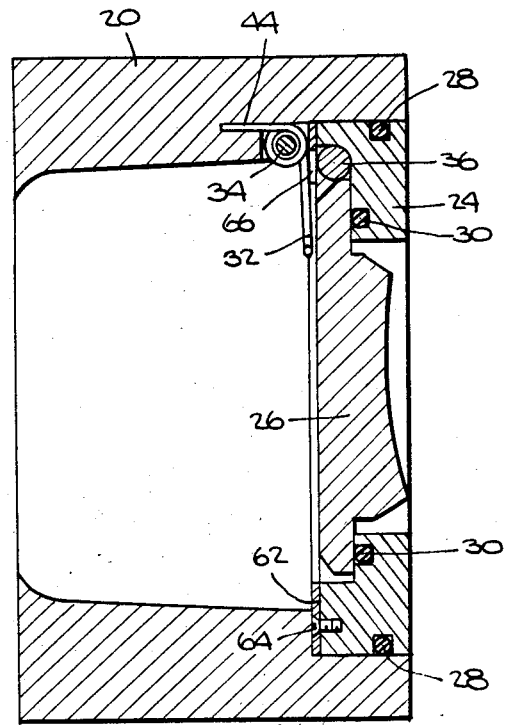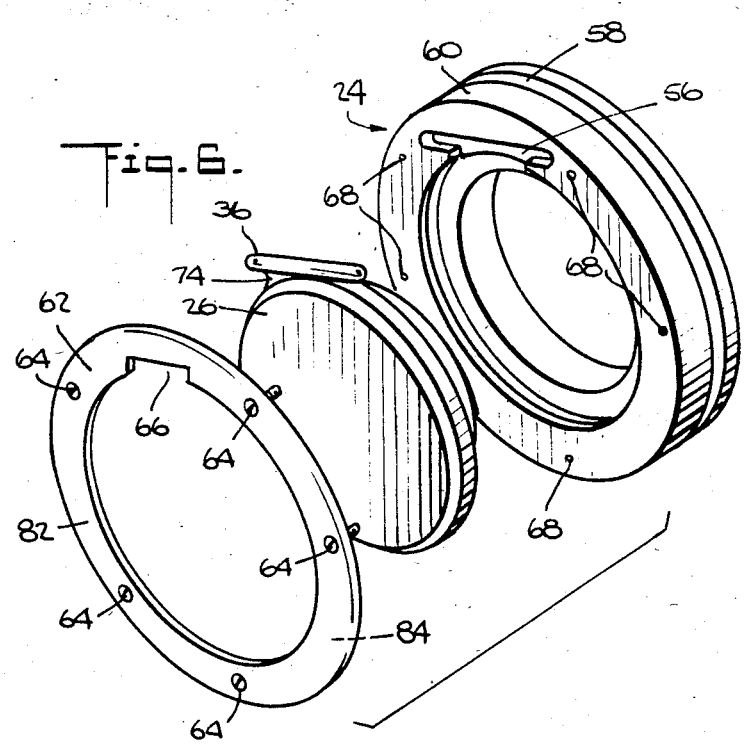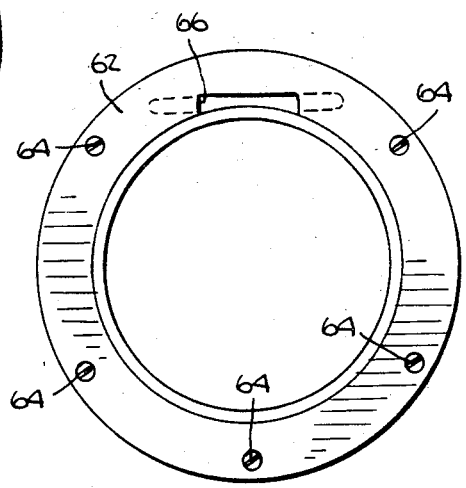

4,605,041

CHECK VALVE

BACKGROUND OF THE INVENTION

One type of check valve generally comprises a valve body with a bore therethrough for the flow of fluid and a flapper that moves between open and closed positions to allow or to block, respectively, fluid flow. The flapper often has an integral pin (or trunnion), which is held in a recess in the valve body, and the flapper rotates on the longitudinal axis of the pin.

Valves and blocking structures are shown in U.S. Pat. No. Re. 21,334, U.S. Pat. Nos. 326,549, 542,417, 705,255, 846,317, 891,012, 922,262, 1,325,568, 1,505,958, 1,673,831, 1,742,043, 2,089,141, 2,265,596, 2,268,806, 2,271,390, 2,342,485, 2,419,318, 2,482,198, 2,532,067, 2,657,824, 2,664,264, 2,767,735, 2,918,934, 2,930,400, 2,959,188, 3,008,650, 3,016,914, 3,023,771, 3,038,494, 3,058,534, 3,066,693, 3,128,785, 3,131,719, 3,144,876, 3,363,645, 3,370,305, 3,482,603, 3,509,908, 3,565,107, 3,604,453, 3,612,097, 3,613,720, 3,618,893, 3,705,602, 3,720,228, 3,726,341, 3,762,438, 3,770,242, 3,817,277, 3,933,173, 3,937,441, 3,974,848, 3,990,471, 4,039,004, 4,054,153, 4,061,535, 4,075,832, 4,114,202, 4,128,111, 4,194,722, 4,196,745, 4,201,241, 4,230,150, 4,274,436, 4,304,255, 4,307,747, 4,427,025, 4,433,702, 4,478,244, 4,480,812, 4,480,815, 4,484,365, 4,485,844, 4,485,846, 4,488,318, 4,488,566, 4,488,571, 4,492,249, 4,493,338, 4,494,564, 4,494,729, in French Pat. No. 2,216,496, and in U.K. Pat. No. 1,214,619.

In U.S. Pat. No. 3,565,107, the pipe flange traps the ends of the flapper pin in the flapper pin groove, thereby keeping the pin in place. In U.S. Pat. Nos. 2,930,400, 3,720,228, and 3,817,277 restraining straps trap the ends of the flapper pin in the flapper pin groove to keep the pin in place. In U.S. Pat. No. 4,274,436 the pipe flange traps the upper horizontal section of the flapper pin in the flapper pin groove.

In U.S. Pat. No. 3,933,173 (and U.K. No. 1,214,619) the flapper pin is trapped in its groove in the valve supporter because the inner face of the valve supporter (which face contains the groove) abuts the face of the counterbore in which the valve supporter is located (see, e.g., FIGS. 1–3). In FIGS. 7–8 of U.S. Pat. No. 4,230,150 a valve is shown in which the flapper pin is trapped in a groove that is closed by a mating surface of the valve. Finally, a retainer to hold a flapper pin in a groove is shown in U.S. Pat. No. 4,201,241.

Despite the foregoing, there is a continuing need for simple, reliable, relatively inexpensive check valves.

SUMMARY OF THE INVENTION

Broadly, the check valve of this invention comprises:
(a) a valve body having a bore therethrough for the flow of fluid and in the bore a counterbore whose diameter is larger than that of the bore, the counterbore having a counterbore periphery and a counterbore face inside the valve body, the counterbore face being at an angle to the axis of the bore, the counterbore face having a biasing means recess;
(b) an insert contained at least partially in the counterbore, the insert having (i) a bore therethrough for the flow of fluid, (ii) an outer periphery that corresponds to and mates with the counterbore periphery, and (iii) an inner face that corresponds to the counterbore face, the inner face having a flapper pin recess;
(c) a flapper having a flapper pin, the flapper pin being rotatably mounted in the flapper pin recess of the insert so that the flapper can rotate between open and closed positions, the closed position blocking the bore of the insert to prevent substantially the flow of fluid through the bore;
(d) biasing means mounted in the biasing means recess of the valve body to bias the flapper towards the closed position; and
(e) blocking means inside the valve for blocking the flapper pin recess to prevent the flapper pin from leaving the flapper pin recess and for blocking the biasing means recess to prevent the biasing means from leaving the biasing means recess.

In one embodiment, the blocking means (e) is a retainer that lies between the flapper pin and the biasing means to keep both in their respective recesses in the insert and the valve body.

In another embodiment the wall of the counterbore and the mating peripheral wall of the insert are sloped so as to be outwardly diverging towards the upstream face of the valve. Accordingly, as the flanges between which the valve is inserted are drawn together by tightening the flange bolts, the periphery of the insert is forced more tightly against the mating wall of the counterbore, thereby making the fluid seal tighter.

The valve of this invention is relatively easy to manufacture and assemble and, therefore, is relatively less expensive. However, the valve affords greater reliability and has a reduced tendency to leak even at higher pressures because the flapper is positively biased closed and with the conical design the insert/valve body seal is tighter. Because of the positive biasing means (e.g., a spring), the flapper need not depend on gravity to close it and, therefore, the valve need not be mounted with the flapper pin axis horizontal. Other advantages will be apparent to those skilled in the art.

BRIEF DESCRIPTION OF THE DRAWINGS

To facilitate further description of the invention, the following drawings are provided in which:

FIG. 3 is a perspective exploded view of the valve of FIG. 1;

FIG. 4 is a sectional view of another valve of this invention in which the periphery of the insert is conical;

FIG. 5 is a sectional view of another valve of this invention in which a retainer is used;

FIG. 6 is a perspective view of the insert, flapper, and retainer of FIG. 5; and FIG. 7 is a front view of the insert, flapper, and retainer of FIG. 5.

These drawings are provided for illustrative purposes only and should not be construed to limit the scope of the invention.

DETAILED DESCRIPTION OF THE INVENTION

Figure 1:
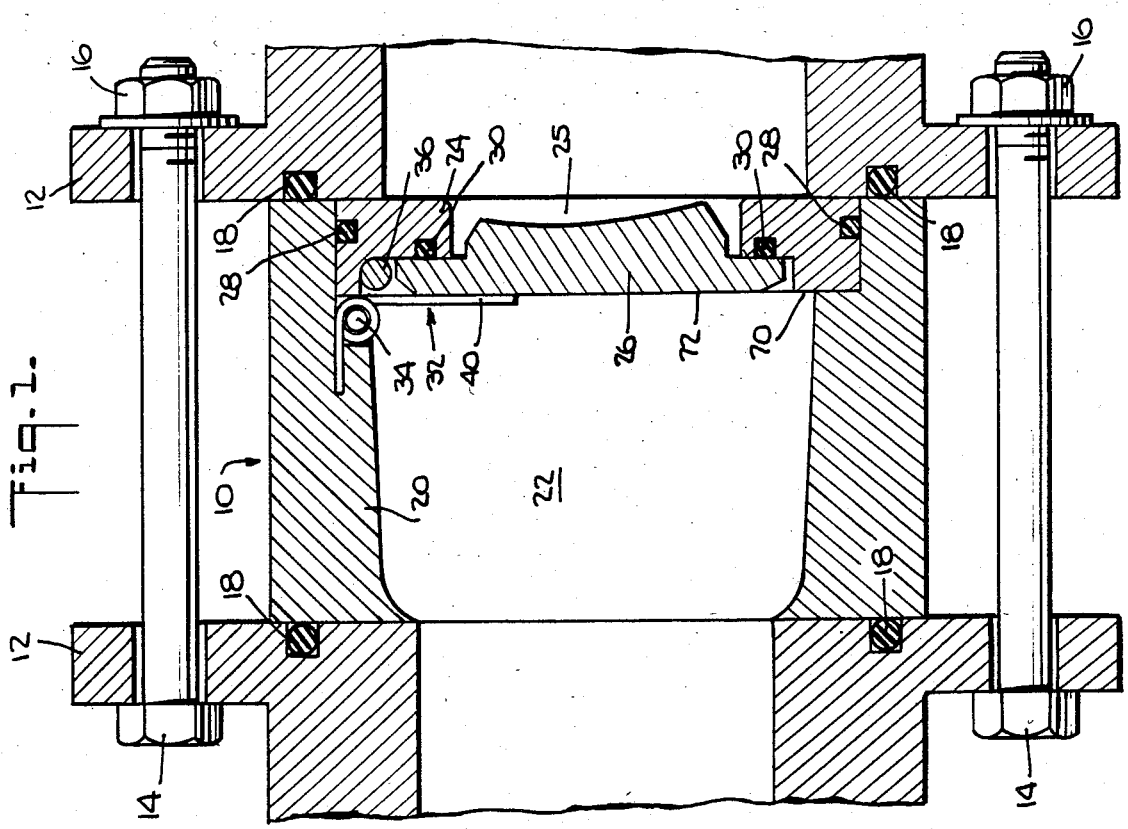
FIG. 1 is a sectional view of a valve of this invention mounted between two flanges in a pipeline, with the valve flapper down (i.e., the valve is closed)

In FIG. 1 valve 10 is held between pipe flanges 12. The valve is held under compression by bolts 14, which are secured by nuts 16. The tendency for fluid to leak between the flanges and the valve is reduced by O-rings 18.

Figure 2:
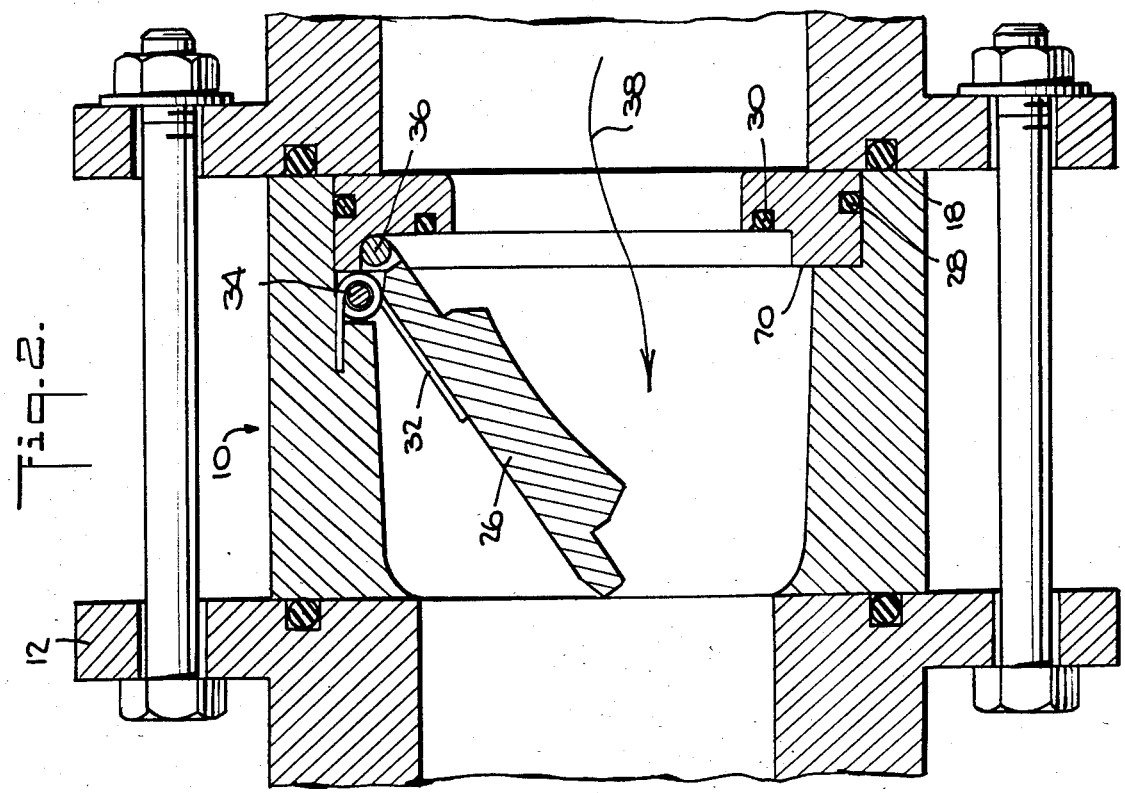
FIG. 2 is a view similar to that of FIG. 1 but with the valve open in response to the flow of fluid.

Referring to FIGS. 1, 2, and 3, valve 10 comprises valve body 20 (which has bore 22 therethrough for the flow of fluid), flapper 26, spring 32, and spring pin 34. Insert 24 is located in counterbore 52 having circular counterbore periphery 53 and counterbore face 54. Insert 24 has outer periphery 60, which corresponds to and mates with counterbore periphery 53, and inner face 70, which corresponds to and lies adjacent to counterbore face 54. O-ring 28, which lies in groove 58, helps provide a seal between insert 24 and valve body 20.

Flapper 26 has an integral trunnion or pin 36, which is held in recess 56 of insert 24. Flapper 26 rotates between its closed and open positions (FIGS. 1 and 2, respectively,) on the longitudinal axis of flapper pin 36. Arrow 38 indicates the flow of fluid in FIG. 2, which flow is opening the valve. O-ring 30 helps provide a seal between flapper 26 and insert 24 when the valve is closed (FIG. 1).

Spring 32 has two pins 44 that are inserted in holes 46 within recess 50. Spring 32 has coil 42, in which spring pin 34 is located, and loop 40. Coil 42 and part of spring pin 34 fit into recess 50. Recess 48 accommodates the ends of spring pin 34. Both recesses open onto counterbore face 54. Loop 40 lies against downstream face 72 of flapper 26 and biases the flapper towards the closed position (FIG. 1). The bottom of recess 50 (the part of the recess located closest to bore 22) provides clearance for flapper section 74, which connects flapper pin 36 to the main part of the flapper, when the flapper is in an open position (FIG. 2).

To assemble the valve, O-rings 28 and 30 are placed in their respective grooves in insert 24 and flapper pin 26 is placed in recess 56. Spring pin 34 is placed in coil 42 and pins 44 are inserted into recesses 46 so that that coil 42 and pin 34 lie in recesses 48 and 50. Insert 24, with the attached O-rings and flapper, is inserted into counterbore 52 so that insert inner face 70 and counterbore face 54 are as close as possible to one another and flapper pin 36 and spring coil 42 are adjacent to one another. Desirably, the axis of coil 42 and the axis of flapper pin 36 are parallel; however, the valve will still operate even if they are not absolutely parallel.

FIG. 4 shows an embodiment which is essentially the same as that of FIGS. 1-3 except that counterbore periphery 53 and insert outer periphery 60 are sloped so as to diverge outwardly, i.e., towards the upstream end 76 of the valve. The two sloping surfaces may also be considered to correspond to the curved surface of the frustum of a cone.

Pushing insert 24 to the left in FIG. 4 (i.e., towards downstream face 78 of the valve) tends to increase the fluid seal between the insert outer periphery and the counterbore periphery. Such biasing of the insert towards the downstream face of the valve (i.e., towards the counterbore face) is done by increasing the compression caused by the flanges on the valve.

With this design, the valve of FIG. 4 is able to provide leak-free operation at pressures significantly higher than its duty rating. In the assembled valve before it is mounted in the pipeline, some small space between counterbore face 54 and insert inner face 70 is allowed so that when the embodiment of FIG. 4 is compressed by the flanges, the insert can move slightly towards the downstream face to increase the fluid seal between the insert periphery and the counterbore periphery. This space will typically be only a few thousandths of an inch. In all embodiments, under normal operating compression between the flanges, outer face 80 of the insert should be essentially coplanar with upstream face 76 of the valve.

In FIGS. 5, 6, and 7 an embodiment using a retainer ring is shown. Retainer 62 is attached to insert 24 by screws 64, which mate with screw holes 68. Cut-out 66 provides clearance for section 74 (between flapper pin 36 and the main part of the flapper) when the valve is open.

In the embodiments of FIGS. 1-4 there is no structure between spring 32 and flapper pin 36, and the insert and counterbore face help hold the spring and flapper pin, respectively, in place. In the embodiment of FIGS. 5-7, the retainer has one face 84, which helps hold the flapper pin in place, and a second face 82, which helps hold spring 32 in place. The retainer typically will be used, if at all, with the smaller diameter valves of this invention. In the smaller valves the flapper pin must be relatively short, and under unusually abrasive conditions the pin may wear excessively. In rare instances the retainer would then be needed to help keep such worn flapper pins in place.

Variations and modifications will be apparent to those skilled in the art. For example, in the same embodiment the retainer of FIGS. 5-7 may be used together with the sloped insert surface of FIG. 4. The claims are intended to cover all variations and modifications that fall within the true spirit and scope of this invention.

I claim:
1. A check valve comprising:
   (a) a valve body having a bore therethrough for the flow of fluid and in the bore a counterbore whose diameter is larger than that of the bore, the counterbore having a counterbore periphery and a counterbore face inside the valve body, the counterbore face being at an angle to the axis of the bore, the counterbore face having a biasing means recess;
   (b) an insert contained at least partially in the counterbore, the insert having (i) a bore therethrough for the flow of fluid, (ii) an outer periphery that corresponds to and mates with the counterbore periphery, and (iii) an inner face that corresponds to the counterbore face, the inner face having a flapper pin recess;
   (c) a flapper having a flapper pin, the flapper pin being rotatably mounted in the flapper pin recess of the insert so that the flapper can rotate between open and closed positions, the closed position blocking the bore of the insert to prevent substantially the flow of fluid through the bore;
   (d) biasing means mounted in the biasing means recess of the valve body to bias the flapper towards the closed position; and
   (e) blocking means inside the valve for blocking the flapper pin recess to prevent the flapper pin from leaving the flapper pin recess and for blocking the biasing means recess to prevent the biasing means from leaving the biasing means recess.

2. The check valve of claim 1 wherein the means for blocking the flapper pin recess and the biasing means recess is a retainer that lies between the insert and the counterbore face.

3. The check valve of claim 1 wherein the means for blocking the flapper pin recess and the biasing means recess comprises the inner face of the insert and the counterbore face.

4. The check valve of claim 1 wherein the biasing means is a spring.

5. A check valve comprising:
(a) a valve body having a bore therethrough for the flow of fluid and in the bore a counterbore whose diameter is larger than that of the bore, the counterbore having a counterbore periphery and a counterbore face inside the valve body, the counterbore face being at an angle to the axis of the bore, the counterbore face having a spring recess;
(b) an insert contained at least partially in the counterbore, the insert having (i) a bore therethrough for the flow of fluid, (ii) an outer periphery that corresponds to and mates with the counterbore periphery, and (iii) an inner face that corresponds to and is adjacent to the counterbore face, the inner face having a flapper pin recess;
(c) a flapper having a flapper pin, the flapper pin being rotatably mounted in the flapper pin recess of the insert so that the flapper can rotate between open and closed positions, the closed position blocking the bore of the insert to prevent substantially the flow of fluid through the bore, the counterbore face blocking at least part of the flapper pin recess to prevent the flapper pin from leaving the flapper pin recess; and
(d) a spring mounted in the spring recess of the valve body to bias the flapper towards the closed position, the insert preventing the spring from leaving the spring recess.

6. The check valve of claim 5 wherein the spring has a coil portion and a spring pin through the coil portion, at least part of the spring pin and the coil portion being mounted in the spring recess.

7. The check valve of claim 5 wherein the counterbore periphery and the insert outer periphery have the shape of the curved portion of a frustum of a cone so that when insert is forced towards the counterbore face the seal between the counterbore periphery and the insert outer periphery tends to increase.

8. A check valve comprising:
(a) a valve body having a bore therethrough for the flow of fluid and in the bore a counterbore whose diameter is larger than that of the bore, the counterbore having a counterbore periphery and a counterbore face inside the valve body, the counterbore face being at an angle to the axis of the bore, the counterbore face having a spring recess;
(b) an insert contained at least partially in the counterbore, the insert having (i) a bore therethrough for the flow of fluid, (ii) an outer periphery that corresponds to and mates with the counterbore periphery, and (iii) an inner face that corresponds to the counterbore face, the inner face having a flapper pin recess;
(c) a flapper having a flapper pin, the flapper pin being rotatably mounted in the flapper pin recess of the insert so that the flapper can rotate between open and closed positions, the closed position blocking the bore of the insert to prevent substantially the flow of fluid through the bore;
(d) a spring mounted in the spring recess of the valve body to bias the flapper towards the closed position; and
(e) a retainer between the inner face of the insert and the counterbore face, the retainer having two faces, one face being adjacent to the inner face of the insert so as to block the flapper pin from leaving the flapper pin recess and the other face being adjacent to the counterbore face so as to block the spring pin from leaving its recess.

9. The check valve of claim 8 wherein the spring has a coil portion and a spring pin through the coil portion, at least part of the spring pin and the coil portion being mounted in the spring recess.

10. The check valve of claim 8 wherein the counterbore periphery and the insert outer periphery have the shape of the curved portion of a frustum of a cone so that when insert is forced towards the counterbore face the seal between the counterbore periphery and the insert outer periphery tends to increase.

* * * * *